Fig. 1

Oct. 2, 1934.  D. S. GRANT  1,975,100
TIME INDICATOR
Filed May 10, 1929  5 Sheets-Sheet 2

Inventor
David S. Grant
by Mitchell, Chadwick & Kent
Attorneys

Oct. 2, 1934.  D. S. GRANT  1,975,100
TIME INDICATOR
Filed May 10, 1929  5 Sheets-Sheet 3

Inventor
David S. Grant
by Mitchell, Chadwick & Kent
Attorneys

Oct. 2, 1934.  D. S. GRANT  1,975,100
TIME INDICATOR
Filed May 10, 1929   5 Sheets-Sheet 4

Inventor
David S. Grant
by Mitchell, Chadwick & Kent
Attorneys

Fig. 12.

Patented Oct. 2, 1934

1,975,100

UNITED STATES PATENT OFFICE 1,975,100

TIME INDICATOR

David S. Grant, Boston, Mass.

Application May 10, 1929, Serial No. 362,049

9 Claims. (Cl. 58—43)

This invention relates to improvements in time indicators. More particularly it provides a device for indicating the zone standard times of the instant, which differ from Greenwich mean solar time by even hours, provided that such a standard time at the same instant is known or assumed for some other place.

In so doing, the invention provides for avoiding a distortion of the representation of the earth beyond what is customary in maps, and also provides for avoiding the necessity of the reader distorting himself in order to see and interpret the indicator correctly. That is, it provides a cartographic representation of the earth in which the location of the places concerned can be easily recognized and in which the human eye can easily read the time indicated for any particular place, without the person reading having to twist his neck and shoulders beyond what is convenient, or to turn the device around, in order to get it right. This makes it applicable for display on a wall, or on a radio receiving set or on a clock, as well as on a device to be held in the hand. Automatic maintenance of correct showing of standard time is provided by means permitting the indicator to be arranged and operated as a part of a clock.

The invention embodies many advantages over previous efforts to show geographical distribution of time, so far as such have become known to me; and these will be manifest from or be found embodied in the apparatus now to be described.

In accomplishing these ends it is a feature that a portrayal of all the inhabited parts of earth's surface, or any desired section thereof, may exhibit the standard time zones thereof, with eye-paths which register with a rotatable hour number indicator disk and, for any particular zone, guide the observer's eye naturally to the correct division thereof for showing the number of the last completed hour. A portrayal of the whole of the earth's surface may be variously arranged, as in hemispheres, or in a Mercator's projection of the whole or of divisions which are distributed about the indicator. For hemispheres the division is made at the meridians 22½° west and 157½° east. This important departure from the customary division between land masses at 20° west and 160° east makes each hemisphere divisible into twelve complete standard time zones.

In one embodiment of the invention for showing time over the whole of the earth the two hemispheres thus divided, represented as circles if desired, but preferably as rectangles by Mercator's projection, are set on opposite sides of the indicating disk, those time zones which have a twelve hour difference of time being extended by eye-paths to register with the same division of the disk. A device in the indicator cooperates to show, for each zone, whether the completed hour indicated is A. M. or P. M. Other arrangements are possible, such as the providing of an individual division of the indicating disk for each individual zone. The apparatus, including the minute hand thereof, may provide complete twenty-four hour indication for a fraction of the earth whose east to west extent covers only a few hours. Mechanism may be provided making intermittent engagement to rotate the indicator quickly through an angular step equal to 15° or to 7½° or to 5° or to 3¾°, depending upon whether the indicator has 24, 48, 72 or 96 divisions; the said indicator normally resting stationary except for the brief instant while it thus is being stepped forward. Also provision may be made for operating the disk by hand independently of such a clock mechanism.

Meanwhile the number of minutes past the hour for all places on the earth having standard time, which differs from that of Greenwich by one or more even hours, is indicated by the single minute hand as it makes its hourly circuit. The standard time at the locality where the device is may be indicated by an ordinary hour hand moving steadily throughout the hour in the ordinary manner.

Further details, aims and the means of accomplishing them will appear from the description of characteristic embodiments of the invention which follow.

There are a considerable variety of ways in which the invention can be embodied; and it will be understood therefore that without departing from the scope of the invention variations in many respects can be made from the particular embodiments here illustrated.

It is intended that the patent shall cover by suitable expression in the appended claims, whatever features of patentable novelty exist in the invention disclosed.

Figure 1:
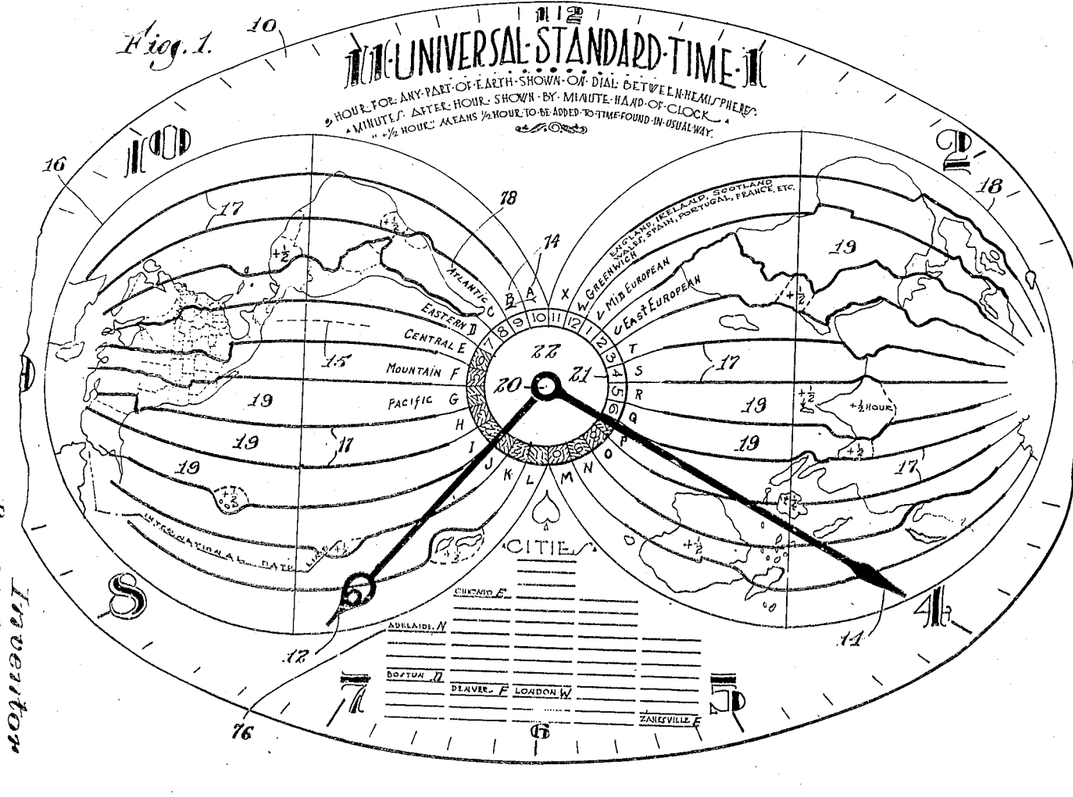
Figure 1 is a front elevation of the dial face of a clock embodying features of the invention, with hemispheres.
Figure 2:
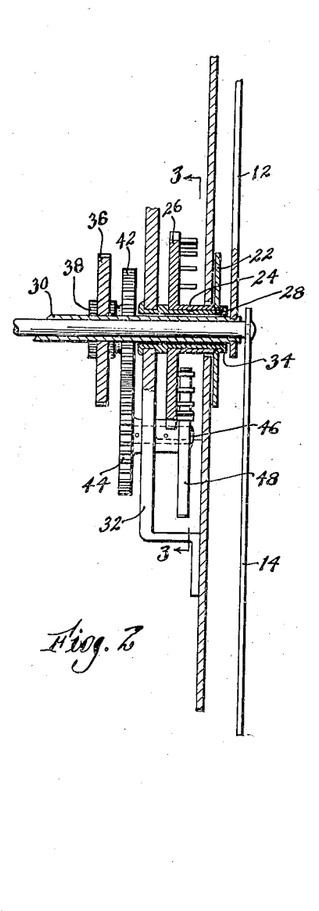
Figure 2 is a side elevation of the device seen in Figure 1, in medial section, showing also some of the mechanism behind the clock face.
Figure 3:
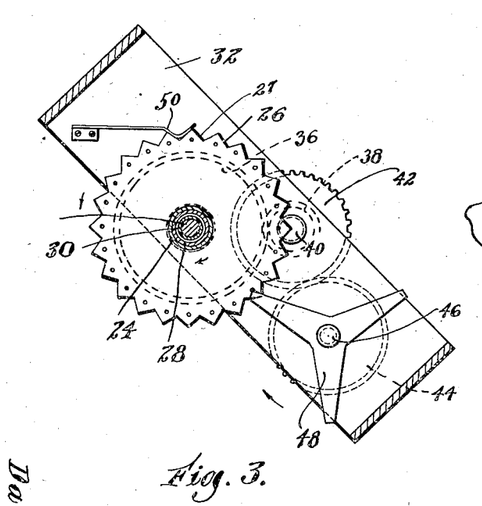
Figure 3 is a front elevation of mechanism located behind the clock face for stepping along the indicator, at the end of each hour, being a section on line 3—3 of Figure 2.

The device can be used for showing relations of standard time between any two locations on the earth. Although it does not require to be associated with a clock, nor to be applied to the whole of the earth, this more complete form is shown in Figures 1–3. The dial face 10 of the clock may be of any chosen shape, oval (Fig. 1), round, (Fig. 12), elongated octagon (Fig. 9) or otherwise, with the usual dial indications over which the hour hand 12 and the minute hand 14 move in the customary way. The places whose time is to be compared are shown by location on the dial and the respective locations are positioned and arranged for individual registry with individual divisions of the indicator. This may be carried out in various ways.

Figure 1 shows a cartographic representation of the whole civilized earth, represented as hemispheres, one containing the eastern continent and the other the western continent, arranged with south polar regions overlying each other at a place where also is located the indicating disk 22.

In the particular representation here made the axis 20 of rotation of the clock hands coincides with the axis of the indicator or disk 22. The indicator stands in the middle of the figure and is rotatable about the axis 20 with a go-and-stop motion, independent of the movement of the clock hands. This disk 22 has twenty-four (or an exact multiple thereof) equal spaces 21 arranged on its face in a circle. These spaces 21 contain hour numbers and may be called hour number spaces, or hour number divisions, but they are not hour spaces or hour divisions in the sense of representing an hour period of time. They do not correspond to an hour of time or to any period of time, or to any unit of space. Rather they represent completed hours, the hour number in a particular space 21, indicating the number of the completed hour for the zone with which that space at any time is in register.

The invention provides so that when the standard time at any particular point on the earth's surface is known or asumed the hour and minute of correct standard time at any other displayed point which has a standard time may be indicated instantly, and the indication be easily read, even though not differing from Greenwich by an integral number of hours.

The hemispheres are each divided by lines 17 which represent the dividing lines between their standard time zones. Often, as at sea, these run along meridians; but on land departures from meridians are notable. Theoretically a standard time zone is an area in the form of a belt, extending north and south, fifteen degrees in width, with meridian boundaries seven and a half degrees to each side of its central meridian which is a standard or time-setting meridian, and which, if not the meridian of Greenwich, differs from it by an exact multiple of fifteen degrees. One of such meridians is shown by dotted line 15 representing a fragment of meridian 90° west, whose local (mean solar) time is the standard time of the central standard time zone of the United States. But in certain land areas, for commercial reasons, convenience, or otherwise, it has been settled by agreement, or by practice, or by law, or by a commission authorized to determine zone limits, that the accurate boundaries are not these theoretical zone limits. There is no occasion to show the time-setting meridians on the present device; nor could these show the area or limits of their respective zones if they were present. According to the invention, the dividing lines 17 prominently displayed are those which accurately divide the areas or points displayed into standard time zones or belts 19. These lines depart from meridian direction where it is proper to do so in order to include or exclude particular areas, and consequently are more or less irregular; and because of the changing conditions of commerce, or otherwise, they are subject to modification from time to time.

The time zone of a particular city whose time is wanted may be ascertained by looking at the map, if its location is known with sufficient accuracy in cases where it is not marked on the map, or by looking at the table or directory 76, where it is seen for example, that Chicago is in zone E, each of the time zones around the earth being preferably identified by a character, as by one of the letters of the alphabet indicated at 74. In such table or directory 76, each city may be followed, not only by a character to designate its time zone, but also by a number, preceded by the proper sign (+ or −) to indicate, in minutes, the difference of its mean solar time from the time indicated by the device. And the thirty minutes difference from the time indicated by the device for any of those few hourly zone standards whose difference from Greenwich includes a half hour, likewise may be indicated in the same manner, (+30 or −30).

An important feature resides in the dividing of the hemispheres on the twenty-two and a half degrees west and one hundred fifty-seven and one half degrees east meridians. So the time zones and the hemispheres mutually conform, and each hemisphere includes a whole number of complete standard time zones. This arrangement would involve the cutting off of a tip of Iceland, which however is included in its proper standard time zone with the remainder of Iceland by suitably representing the zone line. To the ordinary eye the appearance of the hemispheres is the same as that with which the general public is familiar. This preserves the advantages which result from a public familiarity and ready understanding of hemispherical representations while adapting and improving them to the ends of the present invention.

The zone boundary lines 17 all extend from one polar region to the other polar region in the same hemisphere. In Figure 1 the hour number disk 22 overlies the south polar region of each hemisphere and thus overlies a portion of each time zone; and each zone boundary line 17 leads directly to a particular point on the circular path travelled by the circumference of the disk. And each zone 19 can register with a space or division on the margin of the disk.

When driven by the clock, disk 22 rotates intermittently in a counterclockwise direction, moving at the end of each hour through a distance equal to one of its divisions 21. The disk and mechanism may be variously arranged for accomplishing this, the arrangement selected for illustration being as follows: The disk is fast on sleeve 24 which extends loosely backward through the clock dial, and has a pinwheel 26 fast on its rear. Sleeve 24 is rotatable on a fixed tubular support 28 which surrounds the hour hand rotating tubular shaft 30 and is mounted on a broad supporting cross bar 32 in rear of pin wheel 26. The forward end of the fixed tubular support 28, is flanged as at 34 to prevent axial movement of sleeve 24 with its disk 22 and pinwheel 26. In rear of the cross bar 32, and mounted to turn with the hour hand shaft 30, is a 60-tooth gear wheel 36 meshing with an intermediate 15-tooth gear wheel 38 on a stub-shaft 40 which extends rearward from bar 32. A second gear-wheel 42 on stub-shaft 40 has 45 teeth and meshes with a 45-tooth gear wheel 44 on a second stub shaft 46 which also extends rearward from the bar 32, but which as well extends forward slightly beyond the plane of the pinwheel 26, where it carries a three-toothed wheel 48 whose teeth are very long, long enough for each to have a small arc of engagement with a pin of the pinwheel. One tooth passes at each one-third revolution of gear wheel 44, and thus rotates the pinwheel approximately one twenty-fourth of a revolution before passing out of engaging position, although the approximation is not required to be close.

The pin-wheel 26 carries 24 pins spaced apart equally around its margin. With the specified gear ratios, a tooth of wheel 48 will engage a pin on wheel 26 once each hour. A spring detent 50, mounted on bar 32, is formed as a V at its free end for engaging successively in the notches 27 around the circumference of the pin-wheel. Spring detent 50 holds the pin-wheel stationary except while a tooth 48 is rotating the pin-wheel. At those times the spring-arm yields, with its V-end 50 riding up a wall of a notch to the peak of the V, whence its spring tension snaps the peak into the next notch, thus rotating the pin-wheel forward to its next detained position.

Thus at hourly intervals the pin-wheel 26 will be turned one twenty-fourth of a revolution, carrying the indicating hour number disk 22 with it. Preferably, the wheel 48 will be set so as to effect the advance as closely as may be to the exact hour, it engaging a pin, say a minute or so before the hour so that the parts will reach position for spring detent 50 to snap the wheel to the new position precisely when the clock hands indicate the hour. By means of the described gearing, the motion of pin-wheel 26 and hour number disk 22 is counter-clockwise; and the detent is positioned so that the hour number disk 22 comes to rest with each of its 24 divisions 21 registering with a standard time zone 19 or with an eye-path leading from such a zone. The numbers in the divisions of the disk 22 represent the completed hours of day and night, according to any desired system, that shown being the system common in the United States. In order to have the disk 22 advance more quickly, and nearer to the exact hour than would be the case as illustrated, the three tooth wheel 48 would have larger diameter and additional intermediate gears would be employed.

Assuming the local standard time to be as represented by the clock hands in Figure 1 of the drawings, the standard time for any point on the earth's surface having a standard time is indicated directly on the clock, or would be so if the display of places and indications thereon were completely made, it being somewhat diagrammatical as drawn. For example, if it is twenty minutes after seven o'clock in the morning in Boston, Massachusetts, at the same instant in San Francisco, California, it is twenty minutes after four o'clock in the morning. The marginal division of indicating disk 22 which stands opposite the time zone wherein San Francisco lies shows the last completed hour there to be 4, and the minute hand of the clock shows the 20 minutes past that completed hour. Likewise for points in any of the other time zones it would be twenty minutes after the completed hour which stands opposite the particular zone, except that, for certain regions which may be clearly marked with a distinctive indication, several of which are represented in the drawings, such as at 29, one half hour must be added to the time indicated by the device.

The certain regions thus indicated do not differ by even hours from the standard time of Greenwich. Among them are New Zealand, part of Australia, Sarawak, Burma, India, Ceylon, part of British East Africa, Uruguay, Venezuela, Hawaiian Islands, Samoa and the several small islands, for which one-half hour must be added to the time which is directly indicated for these regions. In the drawings these regions are marked with a star or with the instruction "+½" to indicate that the observer should add one-half hour to the standard time as indicated for the zone in which the particular region lies.

To facilitate the correct reading of indicated times, the end portions of zones, leading to the points of registering with the disk, may by shading alternate zones be made into eye paths, so that the eye, having first found a point whose time is desired to be known, naturally follows the broad path of the zone and its extension, without danger of involuntarily shifting into a neighboring zone. A slight distinction of color is sufficient to inhibit the involuntary occurrence of such a change of eye while executing a quick transit among curved and more or less parallel lines, in order to pick out the proper completed hour on the edge of disk 22. Therefore in Figure 7 of the drawings portions of alternate zones are lined to represent a gentle contrast of colors of zones which stand next to each other.

Also, in Figure 1, the indicating disk 22 has the marginal spaces of one half of its circumference cross-lined to represent shading to distinguish the completed night hours.

At the lower part of Figure 1, in the Western Hemisphere, there is represented by dot and dash line at 52 the international date line at which the day changes. If it be Monday above the line 52 as seen in Figure 1, it will be Tuesday below the line. Where this date line is within a time zone, the time of day is the same on both sides of the line but one one side it is Monday and on the other Tuesday.

Figure 7:
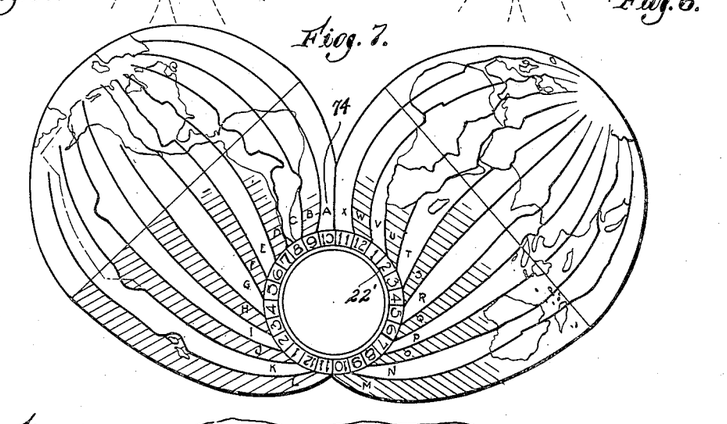
Figure 7 shows a V-arrangement of two hemispheres.

Various relative arrangements of hemispheres with respect to each other, and of the hour number disk 22 with respect to them, may be made without departing from the scope of the invention. In Figure 7 one such modification is illustrated in which, by making a V-angle between polar axes of the two hemispheres, land bodies are brought to a more nearly upright position, and points in both hemispheres can be observed in approximately upright and familiar relative arrangement. Here the hour number indicating disk 22' is arranged below, with its axis close to the apex of the angle formed by the polar axes. Eye-guiding lines lead from the time zones to the marginal hour number spaces on disk 22', and make lanes, which guide this line by continuity of surface aspect.

Figure 8:
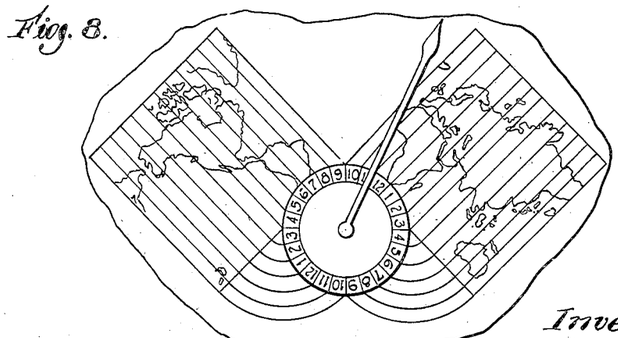
Figure 8 shows another V-arrangement using a Mercator projection and indicating the theoretical time zones.

Obviously this V-arrangement may be applied with Mercator projections, as in Figure 8, or other representations of earth areas, to represent either the whole or selected parts of the earth. And the apex of the V is not necessarily at the south as here shown.

In Figure 1, if the hour hand be omitted the disk 22 would continue to indicate local as well as distant standard time and the minute hand for all.

Figure 5:
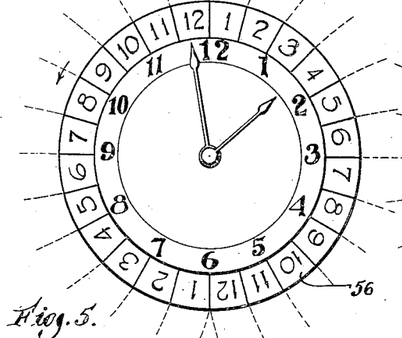
Figures 5 and 6 illustrate modifications of the indicating disk and clock face.

The arrangement shown in Figure 5 has the clock dial small enough to fit within the indicating disk 56, and may employ either one or two hands.

Figure 6:
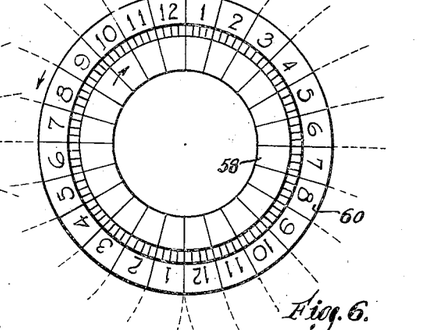

In Figure 6 no hands are needed for determining current local standard time and standard time for other locations. A disk 58, with hour graduations around its margin, and mounted on the hour hand shaft of a 24 hour clock, overlies the indicating disk 60. The outer or wider part only of the exposed margin of this disk 60 is similar to the indicating disks heretofore described, being divided into spaces which represent completed hours, while the inner or narrow part of such exposed margin has hour graduations with sub-divisions representing 15 minute periods. But obviously the graduations may be increased to show five minute periods or even shorter times. In operation the disk 58 rotates steadily clockwise one twenty-fourth of a revolution each hour, and disk 60 advances counter-clockwise, intermittently, one marginal hour space each hour. The hour of current local standard time and the hour of standard time at some distant point both are read from the indicating disk 60; and the minutes past the hour are shown by the relation thereto of disk 58. Thus, if the device is being used in Boston, the hour of current local time will be indicated on disk 60 opposite the time zone in which Boston lies; and the minutes past the hour will be ascertained by observing how far each hour mark on disk 58 has progressed along the scale from one hour mark to the next on disk 60. The standard time in San Francisco will be read in identically the same manner, the hour being as indicated in the space of disk 60 which is opposite the zone including San Francisco, while the minutes past the hour would be the same as for Boston.

Figure 4:
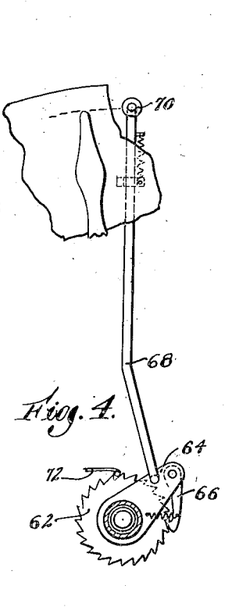
Figure 4 is a detail elevation of another form of mechanism for thus stepping along the indicator or disk, viewed from the front, with the dial and clock hand mostly broken away.

The mechanism hereinbefore described for intermittently advancing the disk 22 of Figures 1–3 may be varied and simplified. Figure 4 illustrates a modified form of mechanism embodying a ratchet wheel 62 which may be mounted so that the indicating disk 22 of Figure 1 turns with it. A pivoted arm 64, beside the ratchet wheel, and freely movable around its axis, carries a pawl 66 at its free end which engages the ratchet teeth. Its operating rod 68, at one end connected to arm 64, has at its other end a roller 70 standing in position to be engaged as a cam by the tip of the minute hand of the clock, as that hand passes, and thus to be lifted enough to advance the pawl 66 and indicator disk 22 one marginal space in counter-clockwise direction. And a spring arm 72 may be arranged to engage yieldingly the respective ratchet teeth to maintain the disk 22 against movement other than at the intervals when the pawl 66 is in the act of advancing it one marginal space.

Thus a practical and simple device is provided which will accurately show the standard times for every point whose zone is displayed or otherwise indicated, provided only that the standard time of some one point is known. The device is not limited to charts in two dimensions; nor to representations of area separated into two or more portions. However the use of a cartographic representation affords a convenient way to classify together those places having the same time, and to indicate their class relation to points otherwise classified. It is feasible to classify by other means the places, whose time is to be shown. Thus each zone may have an indicating symbol, as "A", "B", "C", which symbol may be located in the proper relative position of the zone, in conjunction with the hour disk 22, as at 74; and a tabular list of places, as 76, conveniently located, may tell in which zone each place is classified. Also, if desired, the names of the time zones may appear beside the symbols, as at 78.

Figures 9, 10:
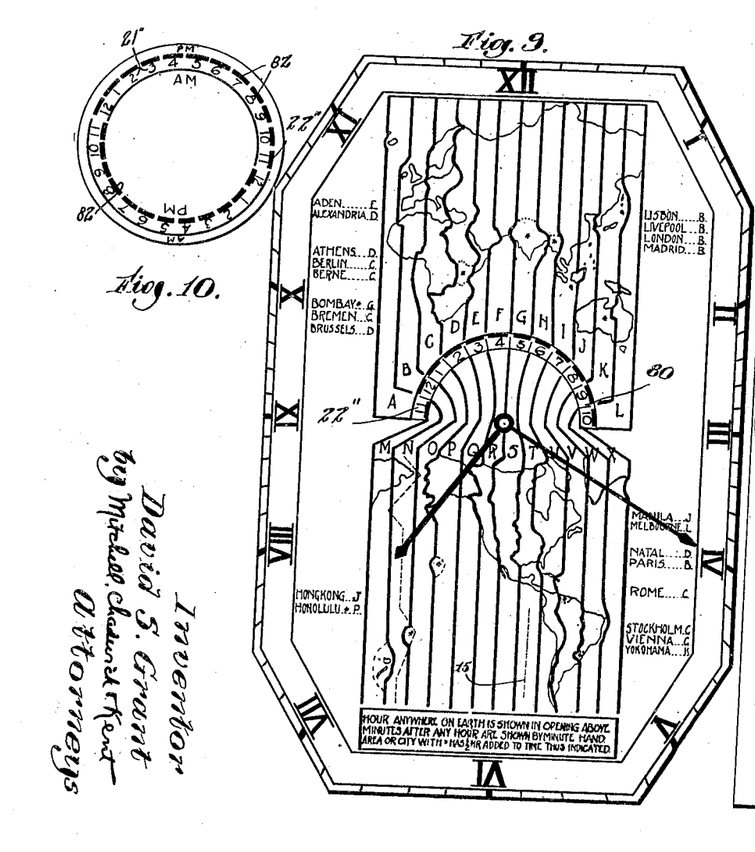
Figure 9 shows another arrangement, using a Mercator projection, which is adapted for the limited confines of a watch.
Figure 10 is a detail of the indicating disk of Figure 9.

Figure 9 represents an arrangement which is in many respects to be preferred because in a concentrated arrangement it shows all parts of the earth in the upright form to which the public is accustomed. In this, the South polar part of the eastern continent is set next above the North polar part of the western continent, both being arranged on Mercator projections, with the hour number indicating disc 22'' intervening, in position for its hour number divisions 21'' to register with the respective time zones of the two hemispheres or with their eye-path extensions, during half of its circuit, through as lot 80 cut in the face of the dial, the remaining half of the hour divisions being concealed from view. The exposed half is that which in normal action moves from east to west. The disk 22'' as a whole is shown in Figure 10, comprising twenty-four hour number divisions 21'' and marked with hour numbers from 1 to 12 with the same division serving for the completed morning hour in the one half of the world and the completed afternoon hour of the same number in the other half. The indication as to whether it is morning or afternoon is effected by the heavy black mark 82 which is placed on that side of the number which is toward the zone that is experiencing a P. M. hour.

Figure 11:
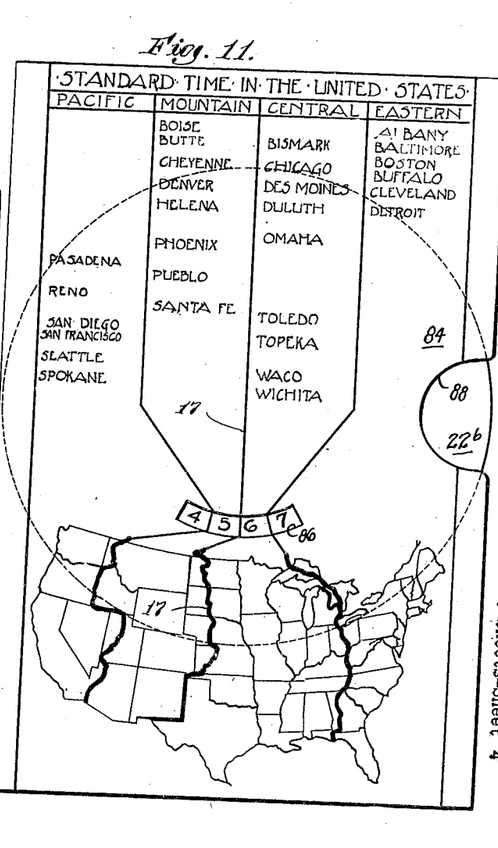
Figure 11 illustrates a ready reference card style displaying a section only of earth surface.

Figure 11 shows an embodiment of the invention in card form, for pocket or for wall display. In such a card both sides of the card 84 are available for carrying desired cartographic representations of earth surface. For example, a two ply card with space for a disk between the plies may be used and the reverse side of card 84 of Figure 11 may be like Figure 9 with the clock and its dial eliminated; and a single large indicating disk 22b, like 22'' of Figure 10, only marked on both sides with hour number divisions and arranged between the two plies of the card, so as to be turned by hand, can serve for both sides of the card. Thus a map of a particular region, such as the United States, may be made on a large scale for more convenient reading of location of points of interest as regards time zones. The completed hour is readily ascertainable through slot 86 on the side seen in Figure 11 by simply setting the disk 22ᵇ by hand so that the number of the current local standard hour is in register with the zone in which the local point is, and then reading the completed hour opposite the zone in which lies the point whose time is wanted. The card may have cut out finger grooves 88 to facilitate convenient manipulation of the disk.

Figure 11 illustrates how the cities of interest may be associated with the number divisions which register with completed hour numbers of standard time either by the cartographic arrangement shown at the bottom or by diagram as shown at the top, where the lines 17' marking spaces containing names of cities correspond to the lines 17, marking zones wherein the cities are located by points or marks showing their locations to a person familiar with the geography of the places concerned. As the hour number indicating disk 22ᵇ must move from east to west for the normal progression of hours, and for showing the relations between time of one zone and time of other zones, the slot 86 and the face markings are arranged to expose the under part of a circle of hour number divisions when a map as in Figure 11 is used with the reverse side of a card, on whose face side the hour number disk rotates in anti-clockwise direction, as is fitting when the upper half of the divisions are exposed as in Figure 9. On either side of the card the standard time for any point on the earth's surface, or represented portions thereof, which has a standard time may be found in the same manner.

Figure 12:
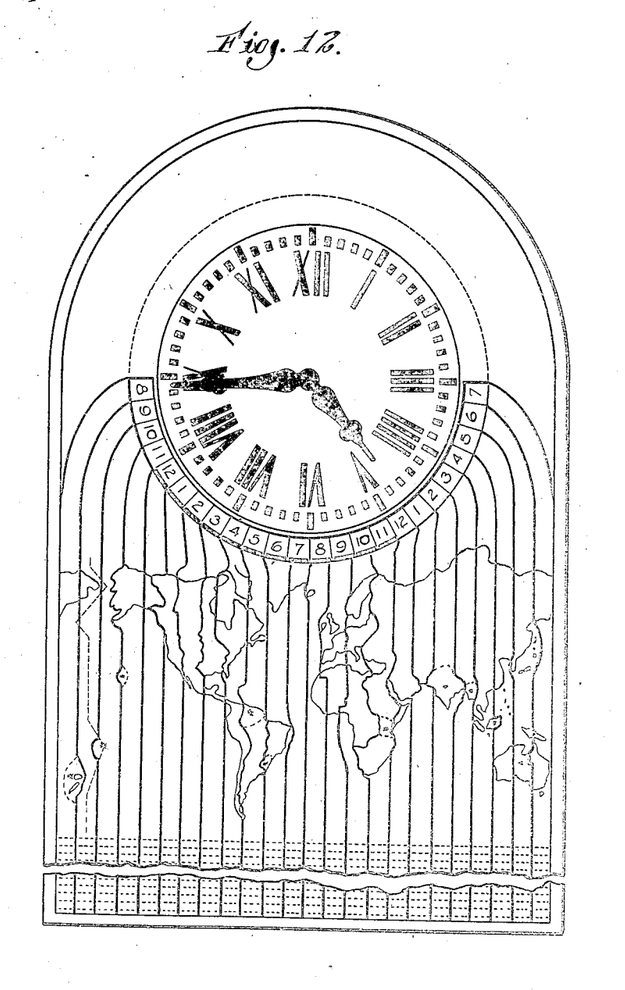
Figure 12 shows the entire earth surface spread in a single area and thus associated with a clock.

In Figure 12 which is well adapted for wall display the whole of the earth's surface is spread out in a single area which conveniently may be arranged either below or above the hour indicating disk. But with this arrangement a disk 22ᵃ having forty-eight hour number divisions is employed, it being arranged with only half of its hour number spaces visible and in register with the standard time zones or their extensions. The dividing of the earth is on the 157½° east meridian, but obviously the division may be on the 22½° west meridian, or any other meridian which is 7½° east or west of a standard meridian which includes or differs from Greenwich by even hours, or as such theoretical zone boundary is modified by the accurate zone boundary, whether the map be arranged above the indicating disk, as illustrated, or below the disk.

While the invention is herein described as it may be operated automatically by a clock, it will be understood that there is a wide field of utility in which the rotation of the disk is not inseparably associated with the movement of a clock, but can be set by hand at any time in order to give information as to what time in what place corresponds to an assumed time in another place. This is possible in the card form of Figure 11 and in any of the dial forms in which the disk is not rigidly enmeshed with the clock mechanism, and is therefore in general true of the mechanism illustrated in Figures 2, 3 and 4, it being only necessary to provide so that a person has access with his fingers to turn the disk as may be desired.

Although the travelling completed hour number indicator is illustrated as being a disk, the invention is not limited to a disk as other devices moving through a path re-currently, and having spaces can serve the purpose. All such are more or less equivalents of which the hour number indicating disk can serve as a type.

I claim as my invention:

1. A time telling device comprising, in combination, a chart of earth surface, divided into a plurality of distinctive areas each marked into sub-divisions representing standard time zones; and an hour-number-indicating disk associated with said areas, mounted rotatably, and having divisions arranged in a circle; each said sub-division registering with a division of said disk; the said disk being capable of resting stationary in said registration; and the said areas being in positions on the chart which are shifted, from their normal cartographic relation to each other to positions on said chart wherein a portion of each zone subdivision approaches the circumference of said hour-disk more nearly at its proportionate hour-distance from other zones on the disk's circumference.

2. A time indicator comprising, in combination, a chart of earth surface marked into divisions representing standard time zones; and an hour-number-indicating disk associated with said chart, mounted rotatably, and having spaces arranged in a circle with each space adapted to be brought into register with any one of said zones; those of said zones which represent areas that are opposite each other on the earth's surface being at opposite sides of the chart; and those of said zones which are next to each other on the chart being alternately of distinguishing shade for the full width of each such zone, and constituting distinctive sight-paths for guiding the eye to said registering spaces of the disk.

3. A time telling device comprising, in combination, a chart divided into two areas, each marked into sub-divisions representing standard time zones; and an hour-number-indicating disk associated with said areas, mounted rotatably, and having spaces arranged in a circle; said areas being arranged in opposed relation, with the zones of one area opposite the zones of the other area; and said indicating disk being arranged for its divisions to be visible between said areas, each in register with a zone of each area.

4. A time telling device comprising, in combination, a chart divided into two areas, each marked into sub-divisions representing standard time zones; and an hour-number-indicating disk, mounted rotatably behind said chart, and having spaces arranged in a circle; said areas being arranged with each zone of one area opposite a zone of the other area which has a twelve hour difference in standard time; and there being an arcuate slot in said chart between the zones of the two said areas and in front of the circle of spaces of said disk, whereby the said hour numbers are visible through said slot, each in register with both of the oppositely arranged zones of a pair.

5. A time telling device comprising, in combination, a plane chart marked into divisions representing standard time zones; an hour-number-indicating disk mounted rotatably behind said chart in substantially the same plane therewith and having spaces arranged in a circle and adapted for each said space to register with different ones of said zone divisions; and there being an arcuate slot in said chart exposing a fraction not exceeding half of the total number of said spaces in register with said zone divisions, whereby the part exposed to visual reading more nearly approximates a straight line, the slot being of different length from the total breadth of zones and there being zone extensions leading from the respective zones to the edge of the slot for said registration.

6. A time telling device comprising, in combination, a chart marked into divisions representing standard time zones; and an hour-number-indicating disk rotatably associated with said chart and having spaces arranged in a circle and adapted for each said space to register with different ones of said zone divisions; each said disk space having a character thereon, and the whole being arranged with the zone divisions which are twelve hours apart extending to opposite sides of the position where the characters appear, so that each said character serves as a time indicator to indicate simultaneously the correct hour of standard time for points in a plurality of time zones which zones have a twelve hour difference in standard time.

7. A time telling device comprising, in combination, a cartographic representation of earth surface divided into two areas with each marked into standard time zones, and arranged for the axes of the two said areas to form a V; and an hour-number-indicating disk rotatably associated with said areas having hour-number divisions, each in registry with one of said zones; said disk being capable of resting stationary in said registration.

8. A time indicating device comprising, in combination, a chart having a series of delimited spaces individually representing zones of earth locations extending in north and south direction, throughout each of which zones the device represents the time as being uniform; and a time indicator, adapted to move along a predetermined circuit with lapse of time; each said time zone being extended by lines leading from its location on the chart to the location of said circuit; and each said time zone there having a terminal portion registering fixedly with a particular part of the said circuit; the relation of the time zone to the movement of the time indicator being that the width of time zone at the said place of registration corresponds to the width of the time unit by which the indicator progresses, there being means causing progression of the indicator by units of time; whereby each time zone is limited to registrability with only a single said indication at any one time; and whereby the particular time indication on the indicator, which at any time is in register with the terminal portion of a particular time zone, is applied as a time indication for the whole of that zone.

9. A time telling device comprising, in combination, a cartographic representation of earth surface, comprising an area marked into standard time zones; and an hour-number-indicating disk associated with said representation of the earth; said disk being rotatable and having divisions at its periphery uniformly graduated for indicating hours of time, some of which graduations stand in radial directions from the disk axis which directions are toward space other than that occupied by said representation of earth; combined with zone-path extensions of the said earth zones, leading through space which is outside both of disk and of earth and passing to some extent around the disk, to fixed locations at the periphery of the disk, past which the disk moves in its said rotation.

DAVID S. GRANT.